United States Patent

Umemura et al.

[11] Patent Number: 5,871,234
[45] Date of Patent: Feb. 16, 1999

[54] STEERING WHEEL WITH AIR BAG UNIT

[75] Inventors: Norio Umemura, Nagoya; Atsushi Nagata, Inazawa; Tooru Koyama, Aichi-ken; Tsuneki Wakamatsu; Takashi Usugi, both of Toyota, all of Japan

[73] Assignee: Toyoda Gosei Co., Ltd., Aichi-ken, Japan

[21] Appl. No.: 905,970

[22] Filed: Aug. 5, 1997

[30] Foreign Application Priority Data

Aug. 9, 1996 [JP] Japan .................................. 8-211350

[51] Int. Cl.$^6$ ........................................ B62D 1/11
[52] U.S. Cl. .............................. 280/777; 280/731; 74/552
[58] Field of Search .................................. 280/731, 750, 280/777; 74/552

[56] References Cited

U.S. PATENT DOCUMENTS 5,244,230  9/1993  Komiya et al. ..................... 280/777
5,356,178 10/1994  Numata ............................. 280/777
5,476,022 12/1995  Koyama et al. ..................... 280/777
5,490,435  2/1996  Famili ................................ 74/552

Primary Examiner—Paul N. Dickson
Attorney, Agent, or Firm—Pillsbury Madison & Sutro LLP

[57] ABSTRACT

An air bag equipped steering wheel that absorbs impact energy of a forward impact, even if applied to the rear side of a ring portion thereof. The steering wheel comprises core bars for connecting its ring portion, boss portion and spoke portions to each other. The spoke portions are composed of two front spoke portions arranged at the right and left of the front side, and a rear spoke portion arranged at the rear side. The air bag unit is securely mounted on the core bars of the front spoke portions and the rear spoke portion. Twistable torsional portions are formed at the core bars of the front spoke portions at positions closer to the core bar of the ring portion than the mounting portion for the air bag unit. A first deformable bent portion is formed at the core bar of the rear spoke portion at the side closer to the boss core bar than the mounting portion for the air bag unit. A second bendable bent portion is formed at the core bar of the ring portion than the mounting portion of the air bag unit and the column cover. The first bent portion is given a lower bending rigidity than the second bent portion.

4 Claims, 5 Drawing Sheets

STEERING WHEEL WITH AIR BAG UNIT

BACKGROUND OF THE INVENTION

1. Field of the Invention

The present invention relates to a vehicle steering wheel. Particularly, the present invention relates to a steering wheel constructed with an air bag unit. More particularly, the present invention relates to a steering wheel capable of absorbing the energy of a forward impact, even if applied to the rear side of the ring portion, and to a steering wheel able to absorb impact energy.

2. Description of the Related Art

A prior art air bag equipped steering wheel constructed for absorbing impact energy, even if applied to the rear side of the ring portion, is disclosed in Japanese Laid-Open Patent No. 278861/1992.

The steering wheel, as disclosed in the above disclosure is constructed with notches in the core bar of the spoke portion at the rear side. Moreover, the core bar of the rear spoke portion plastically deforms when impact energy is applied.

In the disclosed steering wheel, however, only one of the spoke portions of the rear side deforms. As a result, the disclosed steering wheel may be unable to sufficiently absorb the applied impact energy. The reason for this is when the notched core bar of the spoke portion deforms, it makes contact with the column cover which is arranged below the steering wheel. This contact regulates (or interrupts) the deformation. If the spoke core bar fails to plastically deform, some impact energy is not converted into energy used for plastic deformation but remains undissipated. In short, all the applied impact energy cannot be sufficiently absorbed.

SUMMARY OF THE INVENTION

The present invention was conceived to solve the above-specified problem and has an objective of providing a steering wheel with an air bag unit which can sufficiently absorb the energy from a forward impact even if applied to the rear side of the ring portion.

In other words, the object of the present invention is to provide a steering wheel with an air bag unit which is able to sufficiently absorb the impact energy by increasing the deformation stroke of the core bar of the rear spoke portion.

The present invention includes a steering wheel, an annular ring portion, a boss portion arranged at the center of the ring portion, an air bag unit arranged over the boss portion, and a number of spoke portions. The ring portion, the boss portion and the spoke portions each have an internal core bar. The present invention is arranged over a column cover and connected to a sheering shaft.

The spoke portions include two front spoke portions arranged to the right and left of the front side, and a rear spoke portion arranged at the rear side. The boss portion core bar is connected to the steering shaft and the air bag unit is fixedly mounted on the front spoke core bars and the rear spoke core bar generally at the midpoints of such core bars between the boss portion and the ring portion.

The core bars of the front spoke portions have twistable torsional portions formed closer to the ring portion core bar than where the air bag unit is mounted.

The rear spoke portion core bar has a first bent portion located closer to the boss core than the mounting portion of the air bag unit. In addition, the rear spoke core bar has a second bent portion located closer to the ring portion core bar than both the mounting portion for the air bag unit and the column cover. Finally, the first bending portion has a lower rigidity than the second bent portion.

Throughout the specification, the "vertical direction" is defined along the axial direction of the steering shaft connected to the steering wheel. Moreover, the "longitudinal direction" is defined as the horizontal direction of the steering wheel as attached to the vehicle and used to steer the vehicle.

The steering wheel according to the present invention acts in the following when the forward impact is applied to the rear side of the ring portion.

First of all, the torsional portion of each front spoke core bar twists, and the first bent portion of the rear spoke core bar plastically deforms so that the ring portion plane is moved. This ring portion plane is one extending on the upper face of the annular ring portion.

The first bent portion is formed at a portion closer to the boss core bar than the mounting portion of the air bag unit. Therefore, when the ring portion plane moves according to the torsional deformation of each spoke core bar, the mounting portions of the air bag unit in the rear spoke core bars also move to allow the upper face side of the paid of the air bag unit to follow the ring portion plane. This makes it possible to prevent the air bag unit from protruding unnecessarily from the ring portion plane.

After this, the rear spoke portion comes into interference with the column cover. Here, in the rear spoke core bars, the second bent portions are arranged more closely to the ring core bar than both the air bag unit mounting portions and the column cover. Then, the second bent portions plastically bend. As a result, the ring portion plane is moved further.

The steering wheel of the present invention deforms at two stages, as discussed above, where the forward impact is applied to the rear ring portion: the front spoke core bars twist at their torsional portions, and the rear spoke core bars plastically deform at their first bent portions and then at their second bent portions. Moreover, the second bent portions can bend without any interference with the column cover so that the rear spoke core bars may have large deformation strokes. As a result, the steering wheel of the present invention sufficiently absorbs the impact energy acting upon the rear ring portion.

DESCRIPTION OF THE PREFERRED EMBODIMENT

The present invention will be described in connection with a preferred embodiment with reference to the accompanying drawings. The present invention should not be limited to the embodiment but rather includes all modifications and equivalents should be included within the scope of claims,.

Figure 1:
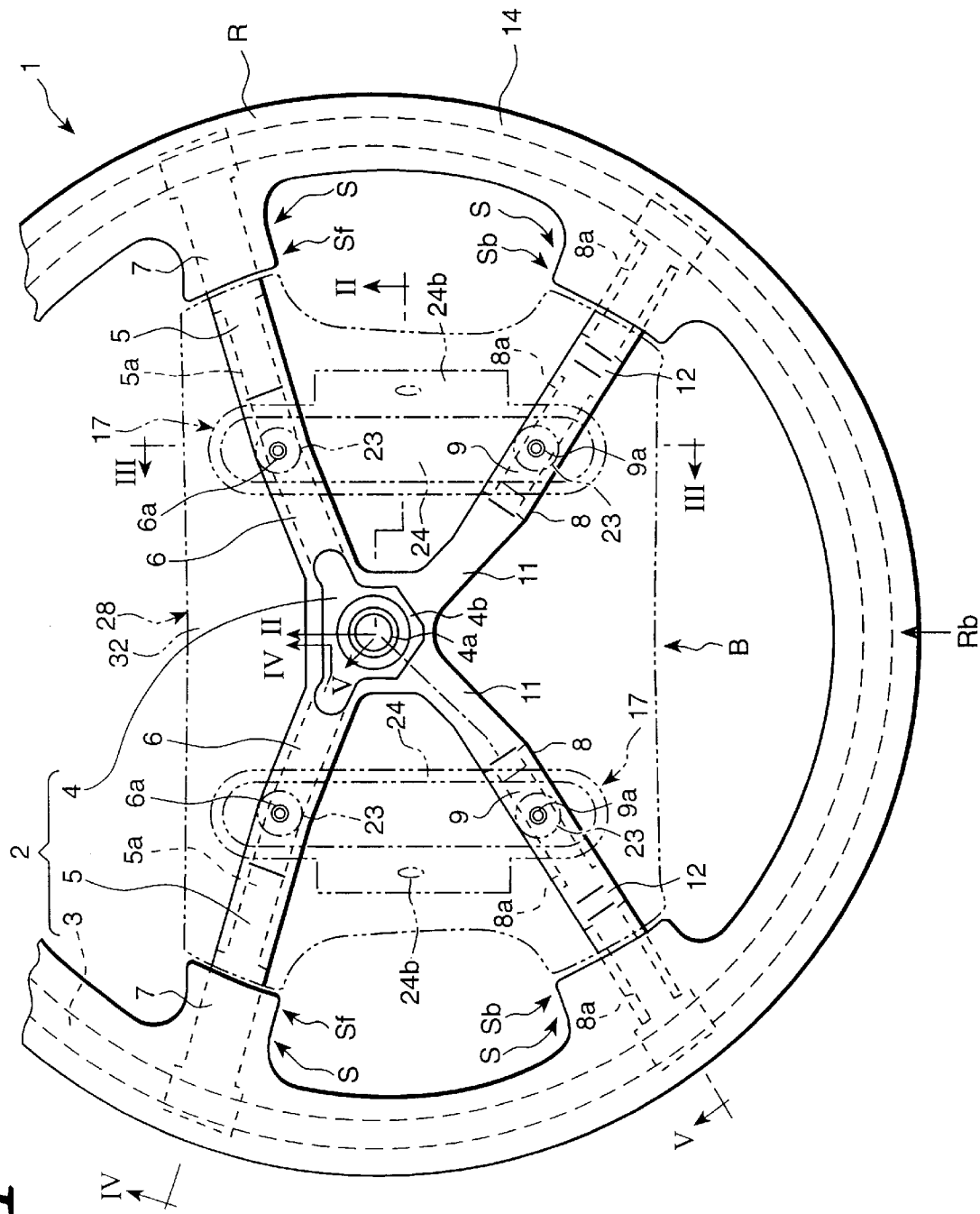
FIG. 1 is a schematic top plan view showing a steering wheel according to one embodiment of the present invention.

A steering wheel 1 according to the present embodiment is constructed, as shown in FIG. 1, to include a ring portion R, a boss portion B and a plurality of spoke portions S. The ring portion R is an annular member that is gripped when the steering wheel 1 is used. The boss portion B is arranged at the center of the ring portion R and individual spoke portions S connect the boss portion B to the ring portion R. An air bag unit 28 is arranged over the boss portion B. The spoke portions S are constructed of two front spoke portions S$f$ arranged at the right and left of the front side, respectively, and two rear spoke portions S$b$ are arranged at the rear side. Core bars, generally indicated at 2, interconnect the ring portion R, the boss portion B and the spoke portion S to each other.

The core bar 2 includes a ring core bar 3, a boss core bar 4, front spoke core bars 5 and rear spoke core bars 8. The ring core bar 3 is made of a steel pipe and arranged within the ring portion R. The boss core bar 4 is arranged in the boss portion B. The front spoke core portions 5 are arranged in the front spoke portions S$f$, while the rear spoke core bars 8 are arranged in the rear spoke portions S$b$.

Figure 2:
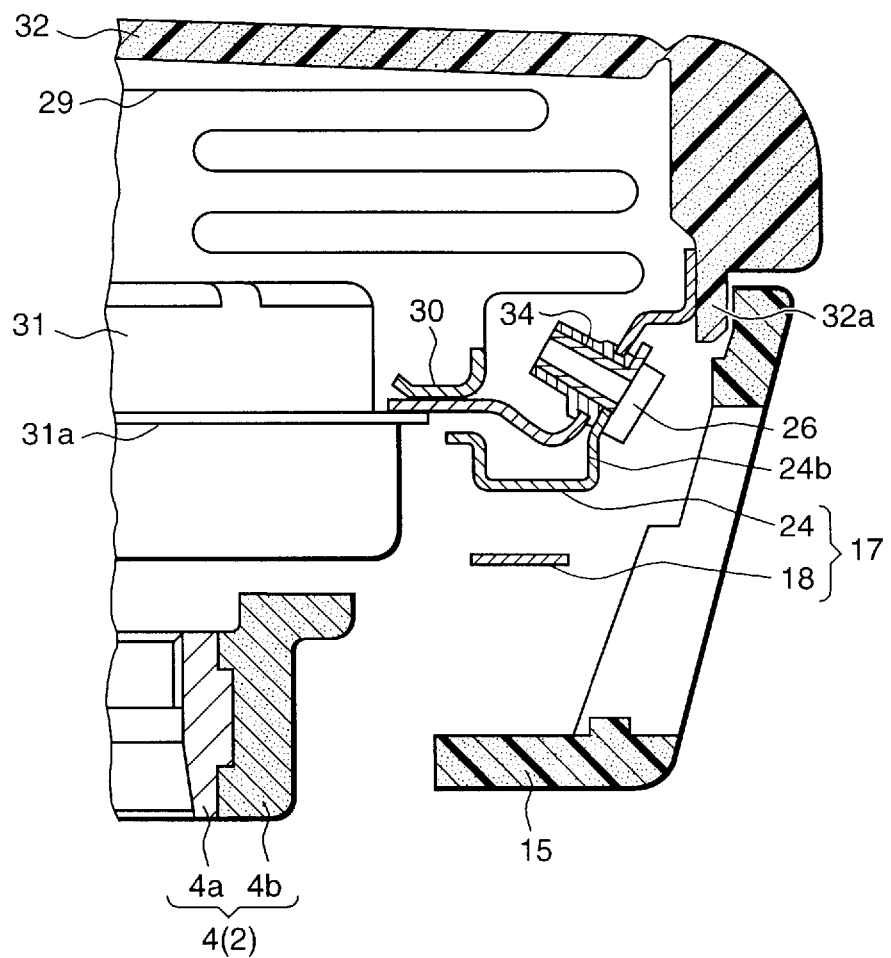
FIG. 2 is a section, as taken along II—II of FIG. 1 and shows a portion of the same embodiment.
Figure 5:
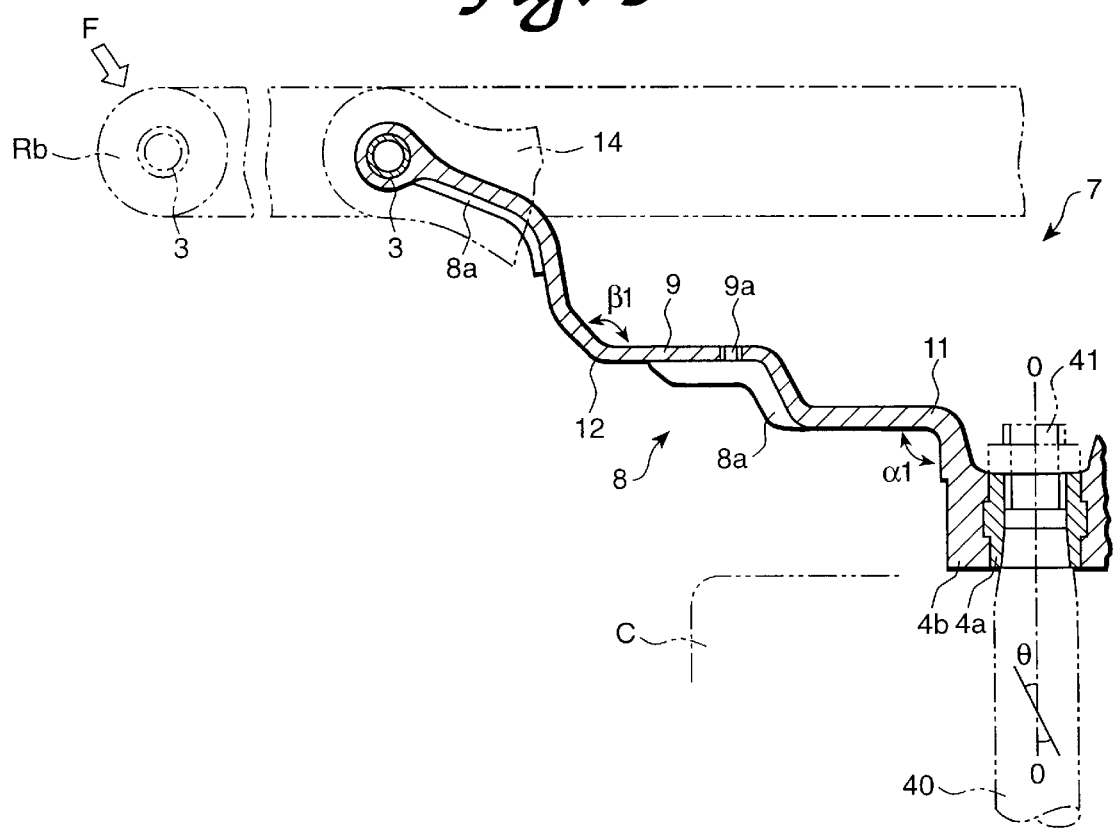
FIG. 5 is a section, as taken along V—V of FIG. 1, and shows a core bar of the same embodiment.

The boss core bar 4 comprises, as shown in FIGS. 2 and 5, a boss 4$a$ and air bag, for example, made of steel and a sheathing portion 4$b$ which sheaths the boss 4$a$. The boss 4$a$ is fixed on a steering shaft 40 by, for example, a nut 41. The sheathing portion 4$b$ can be, for example, die-case of an aluminum alloy, together with the individual spoke core bars 5 and 8. The end portions, as located at the ring core bar 3, of the individual spoke core bars 5 and 8 are cast to envelope the ring core bar 3.

In the steering wheel 1 of the embodiment mounting portions 6 and 9 are formed at the individual spoke core bars 5 and 6, generally at the middle points between the boss portion B and the ring portion R, as shown in FIGS. 1 and 3 to 5. These mounting portions 6 and 9 are flattened at their upper faces to intersect the axial direction of the boss 4$a$ (i.e., the axial direction of the of the steering shaft 40) at a right angle. Moreover, the mounting portions 6 and 9 have mounting holes 6$a$ and 9$a$ for receiving flanged bolts 23. Around the mounting holes 6$a$ and 9$a$ of the individual mounting portions 6 and 9, there are arranged horn switch mechanisms 17 for fixedly mounting the air bag unit 28.

Figure 3:
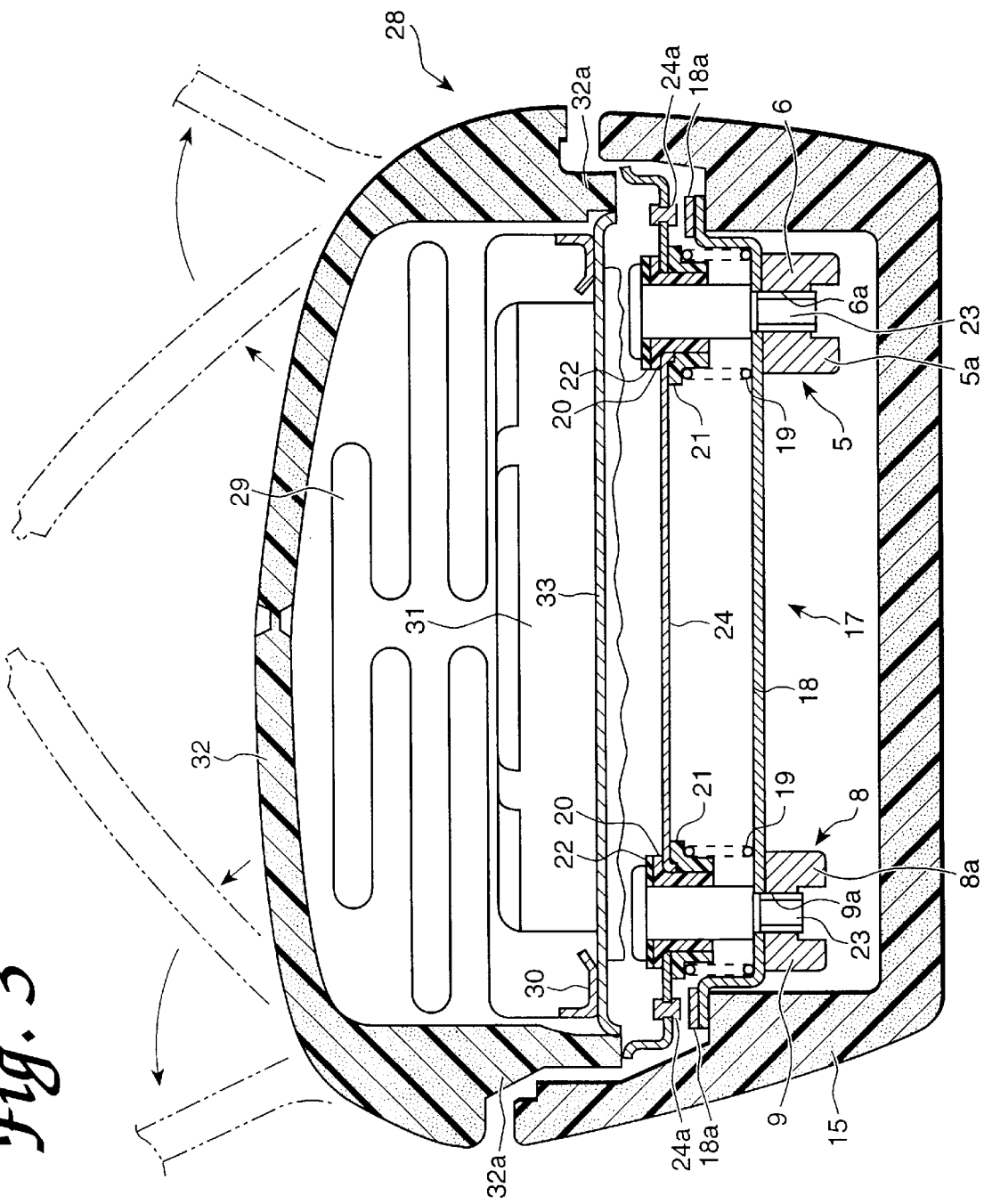
FIG. 3 is a section, as taken along III—III of FIG. 1, and shows a portion of the same embodiment.
Figure 4:
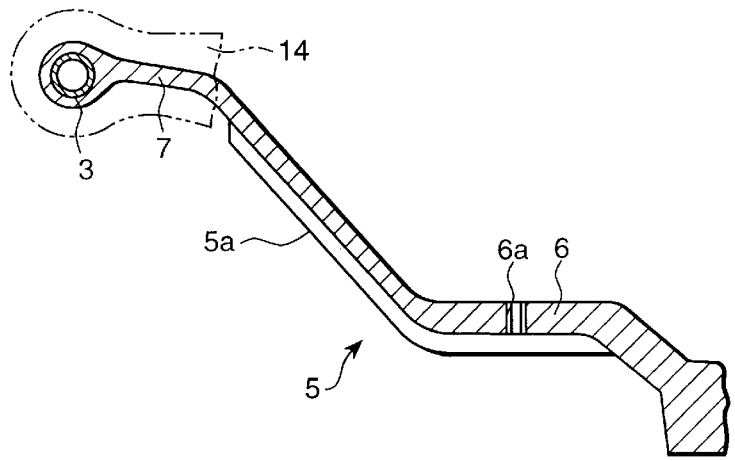
FIG. 4 is a section, as taken along IV—IV of FIG. 1, and shows a core bar of the same embodiment.

A torsional portion 7 is formed in each of the front spoke core bars 5 at the portion closer to the ring core bar 3 than the mounting portion 6. In the embodiment, the torsional portion 7 is formed into a flat plate portion having an upper face intersecting the axial direction 0—0 of the boss 4$a$ generally at a right angle. Ribs 5$a$ are provided to enhance the rigidity of the spoke core bar 5, as shown in FIGS. 1, 3 and 4. However, the torsional portion 7 has no ribs 5$a$ on the lower of its two widthwise edges. In short, the ribs 5$a$ are arranged on the core bar 5 but not on the torsional portion 7.

In each of the rear spoke core bars 8, as shown in FIGS. 1 and 5, a first bent portion 11 is formed at the side of the boss core bar 4 and is positioned at an angle α1, and a second bent portion 12 is formed at the side of the ring core bar 3.

The second bent portion 12 is arranged at the side closer to the ring core bar 3 than both the mounting portion 9 for mounting the air bag unit 28 and the column cover C that extends around the steering shaft 40. In the embodiment, the second bent portion 12 is arranged in the portion which is bent obliquely upward outside mounting portion 9 at an angle β1.

Ribs 8$a$ are provided to enhance the rigidity of the core bars 8 and extend downwardly on the two edges of each rear spoke core bar 8. However, ribs 8$a$ are not formed on the bent portions 11 and 12. Moreover, the first bent portion 11 has a lower bending rigidity than that of the second bent portion 12. In the embodiment, the first bent portion 11 is also narrower in its width than the second bent portion 12 and is abruptly bent to quickly establish a concentration of stress.

In steering wheel 1 the core bar 2, including the ring core bar 3, and the spoke core bars 5 and 8 at the side of the ring core bar 3, are each sheathed with sheathing layers 14 made of a synthetic resin. A lower cover 15, shown in FIGS. 2 and 3, covers the lower portion around boss portion B.

The air bag unit 28 composes, as shown in FIGS. 2 and 3, an air bag 29, an inflator 31, a pad 32 and a bag holder 33. The air bag 29 is formed into a bag shape and is accommodated in a folded shape. The inflator 31 supplies the air bag 29 with an inflating gas. The pad 32 covers the folded air bag 29. The bag holder 33 holds the air bag 29, the inflator 31 and the pad 32. The air bag 29 and the inflator 31 located above the bag holder 33 are attached by an annular retainer 30 arranged in the air bag 29. Specifically, retainer 30 is equipped with a plurality of bolts (not shown) that project downward. Connection of the air bag 29, inflator 31 and holder or retainer 30 is carried out by inserting such bolts through a square flange portion 31$a$ of the air bag 29, the bag holder 33 and the inflator 31 and by fastening nuts onto such bolts. In addition, the retention of the pad 32 by the bag holder 33 is carried out by connecting the downward extending side walls 32$a$ of the pad 32 to the bag holder 33 by means of rivets (not shown).

The air bag unit 28 is mounted on the individual spoke core bars 5 and 8 by use of the horn switch mechanisms 17. In the embodiment, nuts 34 are fixed on the right and left of the bag holder 33 to connect the bag holder 33 to the horn switch mechanisms 17.

These horn switch mechanisms 17 are arranged below and at the two right and left sides of the pad 32. Each horn switch mechanism 17 is composed of a stationary plate 18, a movable plate 24, coil springs 19 and flanged bolts 23. The stationary plate 18 is made of a metallic sheet and arranged longitudinally. The movable plate 24 is also made of a metallic sheet and arranged over and facing the stationary plate 18. Two coil springs 19 are arranged between the plates 18 and 24. Two flanged bolts 23 are used to regulate the distance of the movable plates 24 from the stationary plates 18. The flanged bolts 23 are screwed into the mounting holes 6$a$ and 9$a$ of the mounting portions 6 and 9 of the core bars 5 and 8. Thus, the horn switch mechanisms 17 are fixed on the individual spoke core bars 5 and 8 by flanged bolts 23. Mounting portions 24$b$ are arranged to extend obliquely upward from the outer sides of the individual movable plates 24. Thus, the air bag unit 28 is securely mounted on the individual spoke core bars 5 and 8 by screwing bolts 26 into the nuts 34 of the bag holder 33 through the mounting portions 24$b$ of the individual horn switch mechanisms 17.

Here, as shown in FIGS. 2 and 3, reference numerals 18$a$ and 24$a$ designate contacts formed on the plates 18 and 24, respectively. The contacts 24$a$ of the movable plate 24 are connected to the positive side of a horn switch circuit. On the other hand, the contacts 18$a$ of the stationary plate 18 are connected to the negative side of the horn switch circuit (through the core bars 5 and 8). Reference numbers 20 and 21 appearing in FIG. 3 designate annular insulating spacers for insulating the flanged bolts 23 and the movable plate 24. Moreover, numeral 22 appearing in FIG. 3 designates an annular cushion used to prevent clicking between the movable plate 24 and the flanged bolts 23.

The assembly of the steering wheel 1 of the embodiment will now be described. First, the air big unit 28 is assembled in advance. The lower cover 15 is attached to the core bar 2 which is sheathed with the sheathing layer 14. The horn switching mechanisms 17 are fixedly mounted on the mounting portions 6 and 9 of the individual spoke core bars 5 and 8 by means of bolts 23. Then, the boss 4a of the core bar 2 is connected to the steering shaft 40 of the vehicle by means of nut 41. The peripheral edges of the right and left nuts 34 in the air bag unit 28 are applied to the mounting portions 24b of the individual horn switch mechanisms 17. Bolts 26 are screwed into the individual nuts 34 through the mounting portions 24b. Finally, the steering wheel 1, as assembled, is mounted on the vehicle.

As shown in FIG. 5, the steering shaft 40 is inclined at its upper portion backward when the steering wheel 1 is mounted on the vehicle, so that the axial direction 0—0 of the boss 4a is inclined at its upper portion backward at an angle θ from the vertical line.

The steering wheel 1, as shown in FIGS. 1 and 5, of the embodiment acts, after mounted on the vehicle, in the following manner if an impact F is applied forward to a rear ring portion R*b*.

Figure 6:
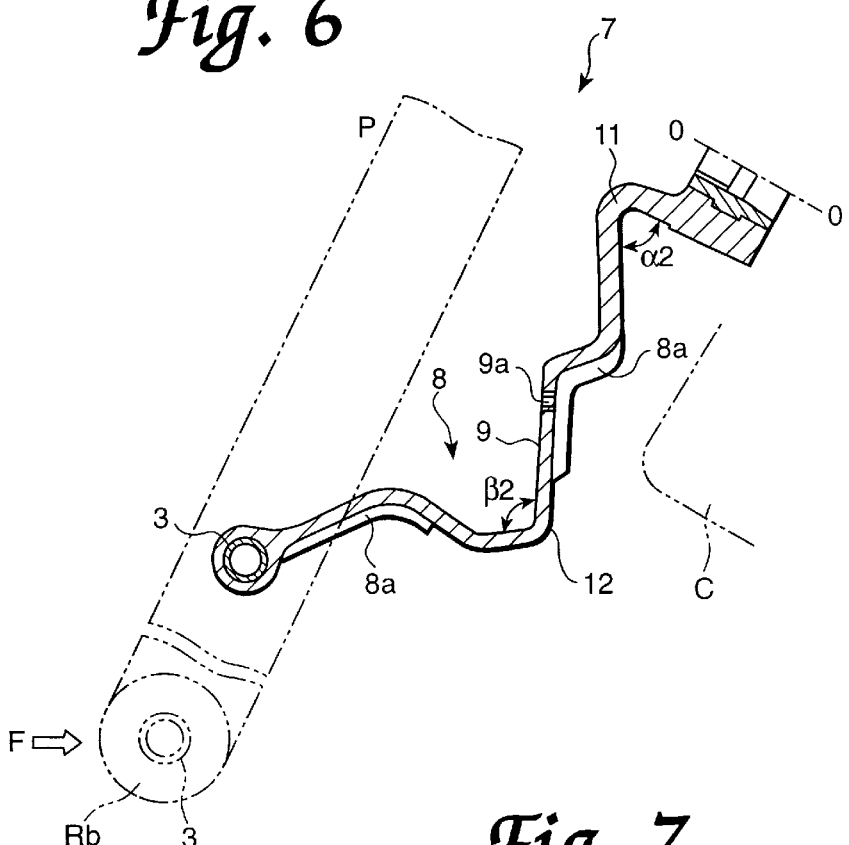
FIG. 6 is a section showing a modification of the core bar of the same embodiment.

First of all, as shown in FIG. 6, the torsional portion 7 of each front spoke core bars 5 is twisted and the first bent portion 11 of the rear spoke core bar 8 is deformed to a reduced angle $\alpha_2$ and the angle of the second bent portion 12 relative to mounting portion 9 is reduced to an angle $\beta_2$. Then, a ring portion plane P is moved toward the torsional portion 7.

Here, the first bent portion 11 is formed at a position closer to the boss core bar 4 than the mounting portion 6 of the air bag unit 28. Therefore, when the ring portion plane P moves according to the torsional deformation of each spoke core bar 6, the mounting portions 9 of the air bag unit 28 in the rear spoke core bars 8 also move to allow the upper face side of the pad 32 of the air bag unit 28 to follow the ring portion plane P. This makes it possible to prevent the air bag unit 28 from protruding unnecessarily from the ring portion plane P.

Figure 7:
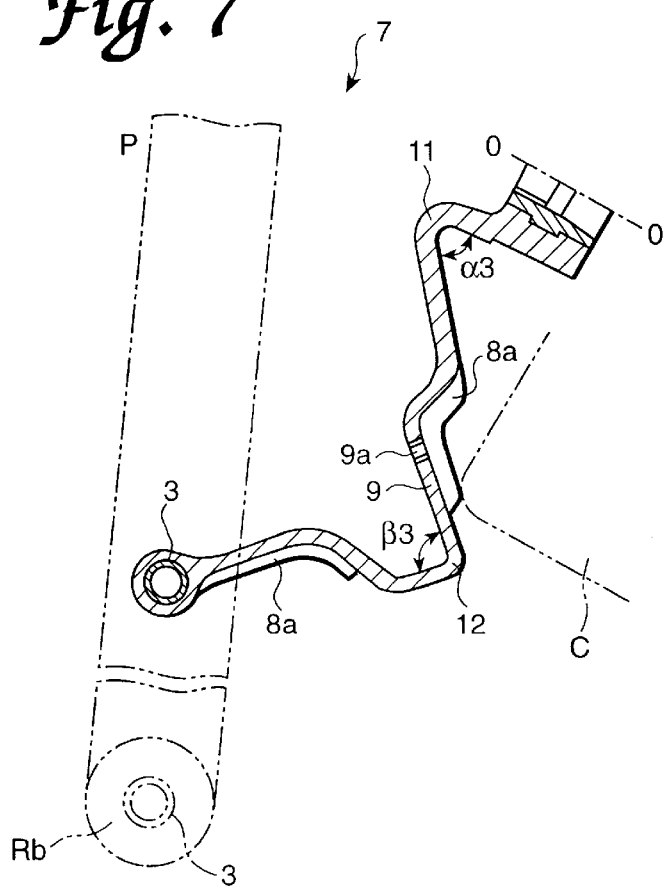
FIG. 7 is a section showing the modification of the core bar of the same embodiment and shows the state after that of FIG. 6.

After this, as in FIGS. 1 and 7, the rear spoke portion S*b* (i.e., the rear spoke core bars 8) comes into interference with the column cover C. The second bent portions 12 of the rear spoke core bars 8 are arranged at the side closer to the ring core bar 3 than the air bag unit mounting portions (i.e., the circumferences of the mounting holes 9a) and the column cover C. As a consequence, the second bent portions 12 are plastically deformed and reduced to an angle $\beta_3$ and the first bent portion 11 is further deformed to an angle $\alpha_3$, as shown in FIG. 7. As a result, the ring portion plane P is further moved toward the vicinity of the torsional portions 7.

The steering wheel 1 of the embodiment is deformed at two stages when the forward impact F is applied to the rear ring portion R*b*: the front spoke core bars 5 are twisted at their torsional portions 7, and the rear spoke core bars 8 are plastically deformed at their first bent portions 11 and then at their second bent portions 12. Moreover, the second bent portions 12 can be further bent without any interference from the column cover C so that the rear spoke core bars 8 can have large deformation strokes. As a result, the steering wheel 1 of the embodiment can sufficiently absorb the energy of the impact F acting upon the rear ring portion R*b*.

Incidentally, the embodiment is exemplified by the construction having the two rear spokes S*b*. However, the present invention may be applied to a steering wheel having three spokes, in which the rear spoke portion S*b* is one.

What is claimed is:

1. A steering wheel having an air bag unit and arranged over a column cover comprising:

an annular ring portion having a ring core bar disposed therein; a boss portion arranged at the center of said ring portion having a boss core bar disposed therein and having said air bag unit arranged thereover; a plurality of spoke portions interconnecting said boss portion and said ring portion, each of said plurality of spoke portions having a spoke core bar disposed therein; wherein said spoke core bars connect said ring portion, said boss portion and said spoke portions to each other;

said plurality of spoke portions comprising two front spoke portions arranged at right and left sides, and a rear spoke portion arranged at a rear side;

said air bag unit is mounted on said front spoke portions and said rear spoke portion;

twistable torsional areas are formed within each of said front spoke portions at a position closer to said ring core bar than a first mounting portion of said air bag unit;

a first bent portion is formed in said rear spoke portion at a point closer to said boss core bar than a second mounting portion of said air bag unit;

a second bent portion is formed in said rear spoke portion at a point closer to said ring portion than said second mounting portion of said air bag unit and said column cover; and wherein said first bent portion has a lower rigidity than said second bent portion.

2. A steering wheel according to claim 1;

wherein said spoke core bars of said spoke portions have ribs on right and left edges; and wherein said ribs on said spoke core bars of said spoke portions are not mounted on the portions where said torsional portions, said first bent portion and said second bent portion are disposed.

3. A steering wheel according to claim 1, wherein the width of said first bent portion is narrower than the width of said second bent portion whereby said first bent portion bends abruptly to establish a concentration of stress.

4. A steering wheel according to claim 1, wherein said rear spoke portion includes two spoke portions.

* * * * *